(12) United States Patent
Vu

(10) Patent No.: US 6,178,335 B1
(45) Date of Patent: *Jan. 23, 2001

(54) WIRELESS COMMUNICATION SYSTEM

(75) Inventor: Trinh D. Vu, Coral Springs, FL (US)

(73) Assignee: Siemens Information and Communication Networks, Inc., Boca Raton, FL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/826,115

(22) Filed: Mar. 27, 1997

(51) Int. Cl.$^7$ .................................... H04Q 7/20
(52) U.S. Cl. .................. 455/558; 455/420; 455/551
(58) Field of Search ................... 455/432, 436, 455/550, 551, 552, 558, 435, 557, 405, 406, 407, 408, 560, 434, 420; 379/357; 235/379, 381, 441

(56) References Cited

U.S. PATENT DOCUMENTS

| | | | |
|---|---|---|---|
| 5,259,018 | * 11/1993 | Grimmett et al. | 455/551 |
| 5,384,834 | 1/1995 | Sato et al. | 379/88 |
| 5,404,580 | * 4/1995 | Simpson et al. | 455/558 |
| 5,428,666 | * 6/1995 | Fyfe et al. | 455/432 |
| 5,465,401 | * 11/1995 | Thompson | 455/558 |
| 5,615,260 | * 3/1997 | Kurgan | 379/433 |
| 5,684,861 | * 11/1997 | Lewis et al. | 455/405 |
| 5,699,406 | * 12/1997 | Liikanen et al. | 455/90 |
| 5,732,349 | * 3/1998 | Sanpei et al. | 455/435 |
| 5,734,980 | * 3/1998 | Hooper et al. | 455/434 |
| 5,764,730 | * 6/1998 | Rabe et al. | 455/403 |
| 5,778,322 | * 7/1998 | Rydbeck | 455/558 |
| 5,987,325 | * 11/1999 | Tayloe | 455/552 |
| 5,999,813 | * 12/1999 | Lu et al. | 455/435 |

FOREIGN PATENT DOCUMENTS 2 269 512   2/1994 (GB).

* cited by examiner

*Primary Examiner*—Dwayne D. Bost
*Assistant Examiner*—Jean A Gelin
(74) *Attorney, Agent, or Firm*—Joseph S. Codispoti

(57) ABSTRACT

A personal communication system handset having a plurality of slots provided therein. Each one of the slots is adapted to store a corresponding one of a plurality of removable/insertable subscriber identity modules. The subscriber identity modules have stored therein different subscriber information. A user is thereby able to subscribe to two, or more, different providers and is able to remove at least one of the modules for use in another handset. An electronic switch is disposed in the handset for electrically coupling one of the modules to a transceiver in the handset selectively in accordance with a program stored in the handset based on a signal received by the transceiver from a base station cell. The selected module provides the base station cell with the stored subscriber information. Thus, the handset can automatically select the proper module based on the stored program. An automatic subscriber identification module control system is also provided. The system includes a handset having a plurality of subscriber identity modules. A transceiver is disposed in the handset for receiving and transmitting signals from and to a plurality of base station cells. A memory is also disposed in the handset, such memory storing an executable program. A processor in the handset is responsive to the signals received by the transceiver, or solely from information stored in the memory, and is adapted to execute the stored program to producing a control signal in accordance with the received signals and/or the executed program.

2 Claims, 7 Drawing Sheets

Note: End means the end of one scan, the handset can sleep for a certain time duration before go back to Start.

WIRELESS COMMUNICATION SYSTEM

TECHNICAL FIELD

This invention relates generally to wireless communication systems and more particularly to personal communication systems and cellular telephone systems adapted to operate in different geographical locations.

BACKGROUND OF THE INVENTION

As is known in the art, current cellular telephone use has expanded rapidly over the past few years. While typically a user subscribes to only one service provider and is assigned a single telephone number, many subscribers have cellular phones adapted to operate with two different telephone numbers. Thus, when the subscriber operates in one geographical location he/she manually selects one of two Number Assignment Modules (NAMs) provided within his/her cellular telephone. In this way, if the subscriber generally travels to, and works in, two geographical locations he/she can select the NAM associated with a local service provider thereby reducing long distance telephone costs and inter-network roaming charges. Thus, these users are able to obtain two subscriptions from two service providers in two different geographical locations for the same handset. In other words, dual subscription is achieved by having the same handset programmed with different telephone numbers of subscription information in different Number Assignment Modules (NAMs); one for each of the two different geographical locations of the local service provider. This arrangement allows a roaming subscriber to save roaming fees and long distance charges, which can be very expensive if the user frequently travels between two locations and merely uses the same subscribed local service provider when on travel. However, as noted above, the user must manually select the NAM to be used and the NAMs are not removable by the user.

As is also known in the art, certain cellular telephones are adapted to receive a credit-card sized Subscriber Identity Module (SIM). Each SIM is associated with a unique service provider and has stored therein different subscriber information. This information is transmitted to a receiving radio base station cell to obtain network access. Thus, in one example, one SIM may be associated with a subscriber's business telephone number and another with his/her home telephone number. In this case, each SIM may be for the same or different providers in the same Public Land Mobile Network (PLMN), or for the same or different providers in different PLMNs. Thus, if a subscriber is on travel to a different geographical location from his/her home office, he/she needs only to remove the SIM from his/her handset, slips it into his/her wallet, rents a handset at the other location where the radio frequency coverage is different from his/her own handset (i.e, where the user travels from the United States to Europe) and merely inserts the SIM into the rented handset. During operation, the subscriber's information is transmitted from the SIM to the local base station cell to obtain authorization from the home PLMN.

In a PCS 1900 network, multiple subscriber number service for voice application is not possible with a single Subscriber Identity Module (SIM) in the handset since it can only be provided with one Mobile Subscriber Integrated Service Digital Network (MSISDN) number for voice service per Global System for Mobile (GSM) standards. In GSM communication, standards allow for two SIMs in a handset. One of the SIMs must be the plug-in type. The plug-in type SIM is very small (i.e., chip size) and, if removed from the handset, may be easily lost. For the GSM handset, there can only be one full size, i.e., credit-card like SIM.

It is noted that both NAM and SIM refer to modules which provide subscriber identification information and are both sometimes referred to hereinafter as subscriber identity modules.

SUMMARY OF THE INVENTION

In accordance with the present invention, a personal communication system handset is provided. The handset has a plurality of slots provided therein. Each one of the slots is adapted to store a corresponding one of a plurality of removable/insertable subscriber identity modules. The subscriber identity modules have stored therein different subscriber information.

With such arrangement, a user is able to subscribe to two, or more, different providers and is able to remove at least one of the modules for use in another handset. Further, the modules are credit-card size and are therefore less likely to be lost, or misplaced, than a chip sized module.

In accordance with another feature of the invention, an electronic switch is disposed in the handset for electrically coupling one of the modules to a transceiver in the handset selectively in accordance with a program stored in the handset based on a signal received by the transceiver from a base station cell. The selected module provides the base station cell with the stored subscriber information.

With such an arrangement, the handset can automatically select the proper module based on the stored program.

In accordance with another feature of the invention, an automatic subscriber identification module control system is provided. The system includes a handset having a plurality of subscriber identity modules. A transceiver is disposed in the handset for receiving and transmitting signals from and to a base station cell. A memory is also disposed in the handset, such memory storing an executable program. A processor in the handset is responsive to the signals received by the transceiver and adapted to execute the stored program to producing a control signal in accordance with the received signals and the executed program. A electronic switch, disposed in the handset, is provided for coupling one of the plurality of subscriber identity modules to the processor selectively in response to the control signal. The subscriber identity modules have stored therein different subscriber information and the module selected by the control signal provides, via the transceiver, the subscriber information stored therein to the base station cell.

With such an arrangement, a user may travel to a different PLMN and the handset automatically select a module associated with a nearby home network thereby saving long distance and roaming charges.

BRIEF DESCRIPTION OF THE DRAWINGS

For a better understanding of the invention, reference is made to the following description of an exemplary embodiment thereof, and to the accompanying drawings, wherein.

DETAILED DESCRIPTION

Figure 3:
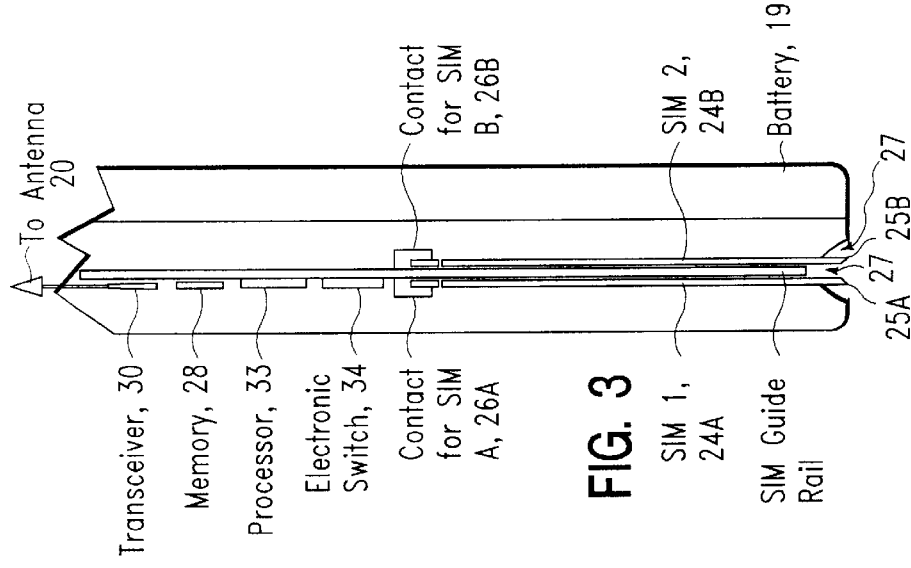
FIG. 3 is a diagrammatical, partially broken away side elevation view of the interior bottom portion of the PCS handset of FIG. 1.
Figure 2:
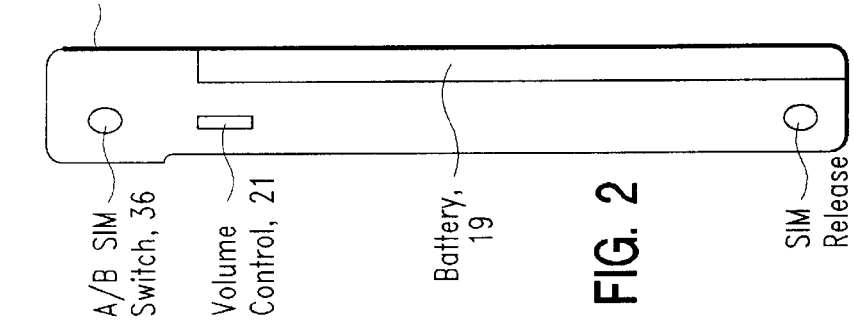
FIG. 2 is a side elevation view of the PCS handset of FIG. 1.
Figure 1:
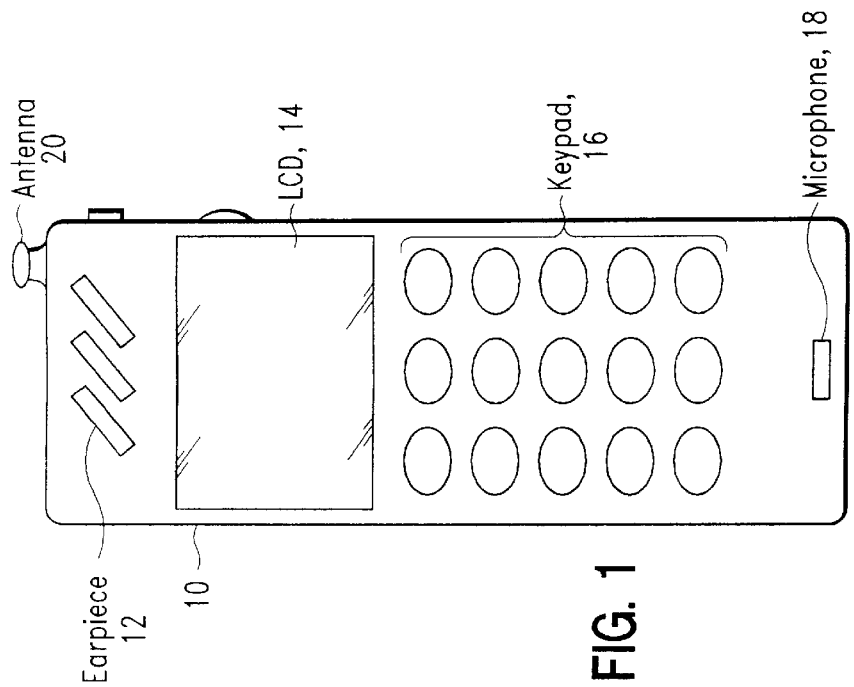
FIG. 1 is a front elevation view of a personal communication system (PCS) handset in accordance with the invention.
Figure 4:
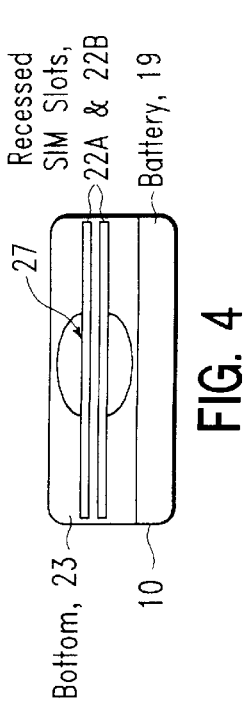
FIG. 4 is a bottom view of the PCS handset of FIG. 1.

Referring now to FIGS. 1 through 5, a personal communication system handset 10 is shown. The handset 10 has an earpiece 12, liquid crystal display 14, keypad 16, microphone 18, a battery 19, antenna 20, and volume control 21, as shown. The handset 10 has a plurality of slots 22a, 22b provided therein. Each one of the slots 22a, 22b is open-ended at the bottom 23 (FIG. 4) of the handset 10 and is adapted to store a corresponding one of a plurality of removable/insertable subscriber identity modules (SIMs) 23a, 24b, respectively, as shown. The subscriber identity modules (SIMs) 23a, 24b are of conventional design and are provided with electrical contacts at the upper ends thereof which, when inserted upwardly into the bottom 23 open-ended slots engage conventional set of resilient female receptacle electrical contacts 26A, 26B to frictionally engage the electrical contacts. It is noted that when fully inserted into the slots 22a, 22b, the bottom portion of the SIMs 23a, 24b extend within a groove 27 formed in the bottom portion 23 of the handset 10 so that a user may easily grab the bottom portion 25a, 25b of each one of the SIMs 23a, 24b and remove it from the handset 10. Thus, each one of the SIMs 23a, 24b, which is the size of a conventional credit-card, may be easily slipped into and removed from the handset 10. Each one of the SIMs 23a, 24b have stored therein different subscriber information.

Figure 5:
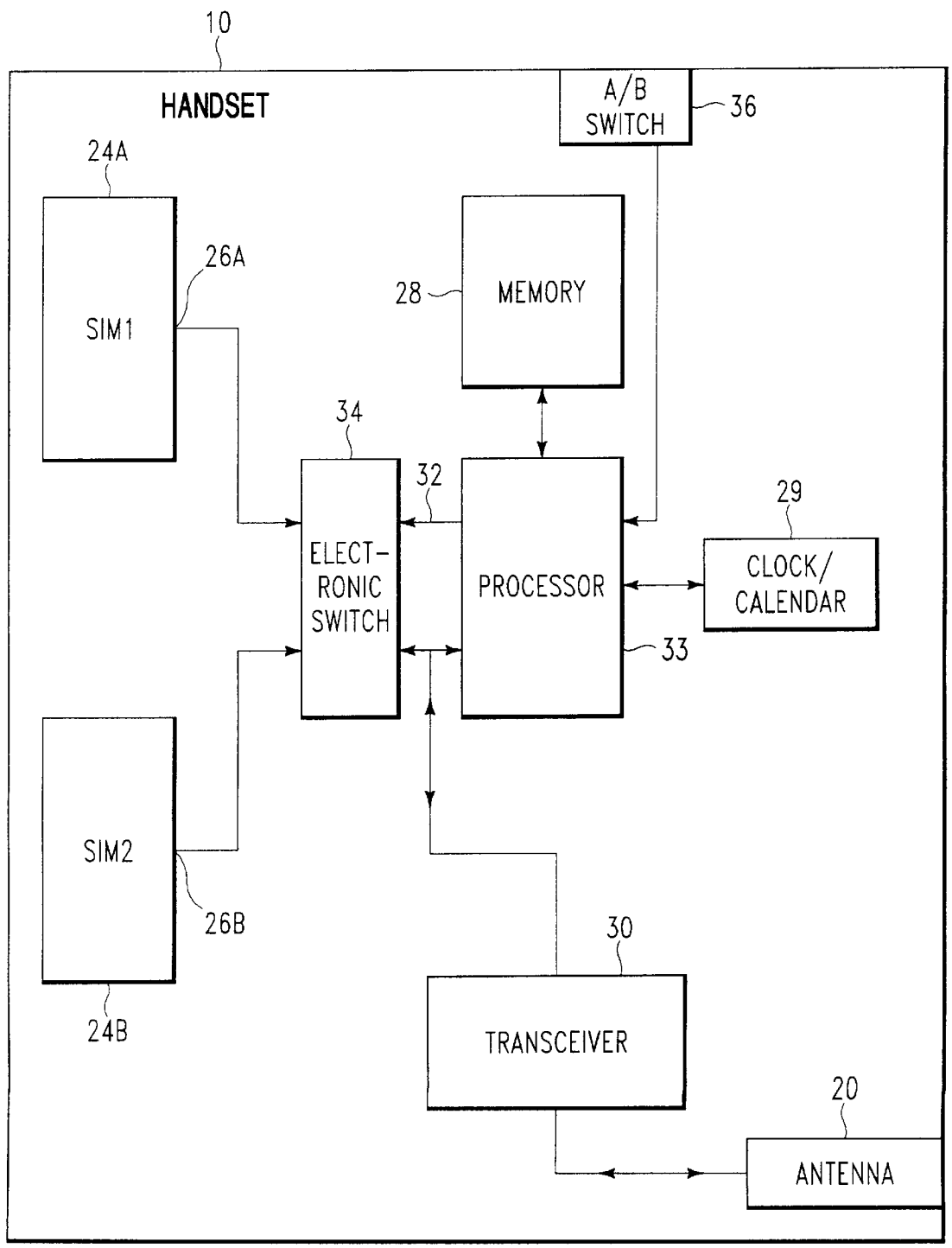
FIG. 5 is a schematic diagram of components disposed in the PCS handset of FIG. 1.
Figure 6A:
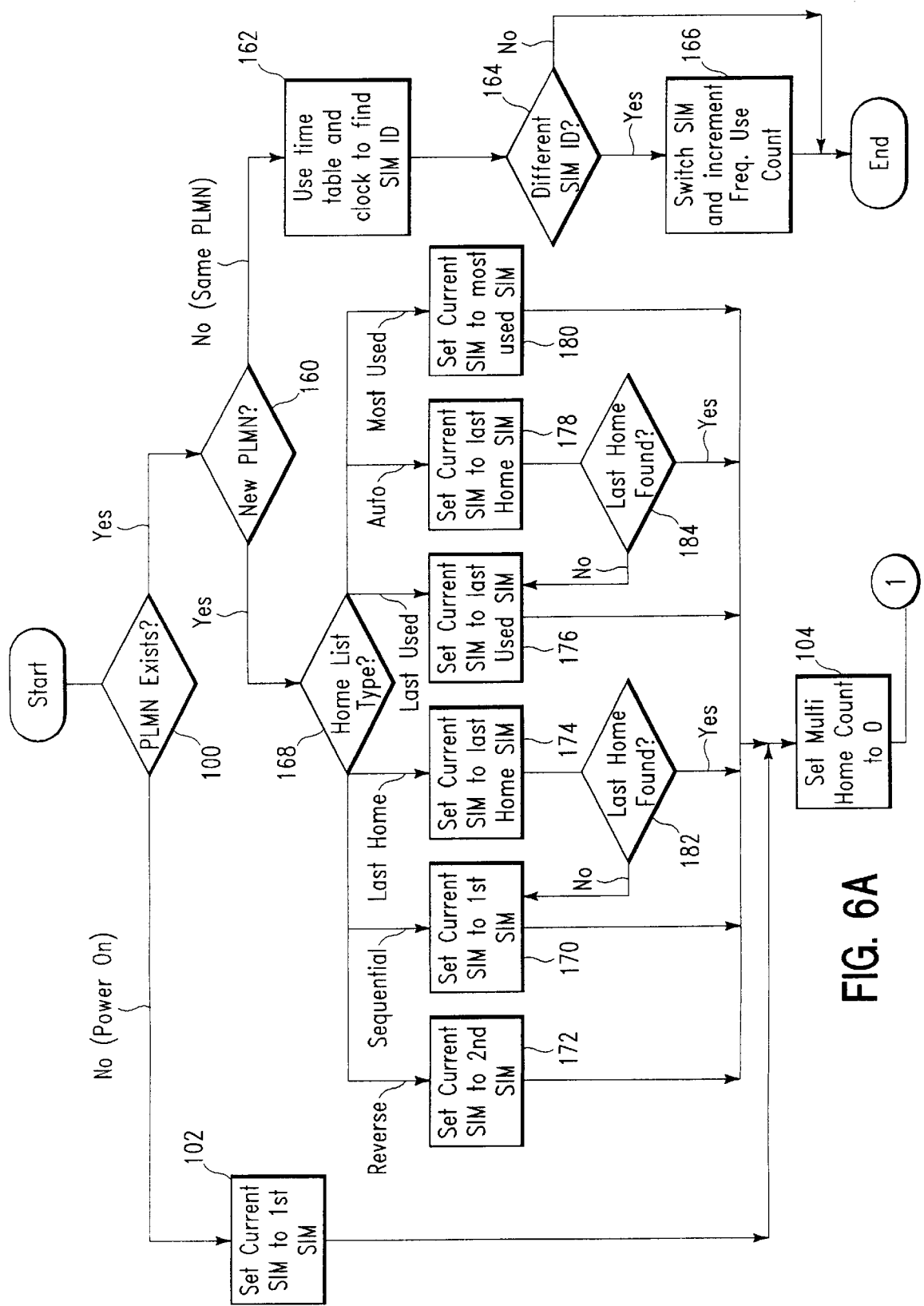
FIG. 6A though 6D together is a flow diagram of a program stored in a memory of the PCS handset of FIG. 1 and executable by a processor also disposed in the PCS handset to select one of a plurality of subscriber identity modules (SIMs) stored in the PCS handset.
Figure 6B:
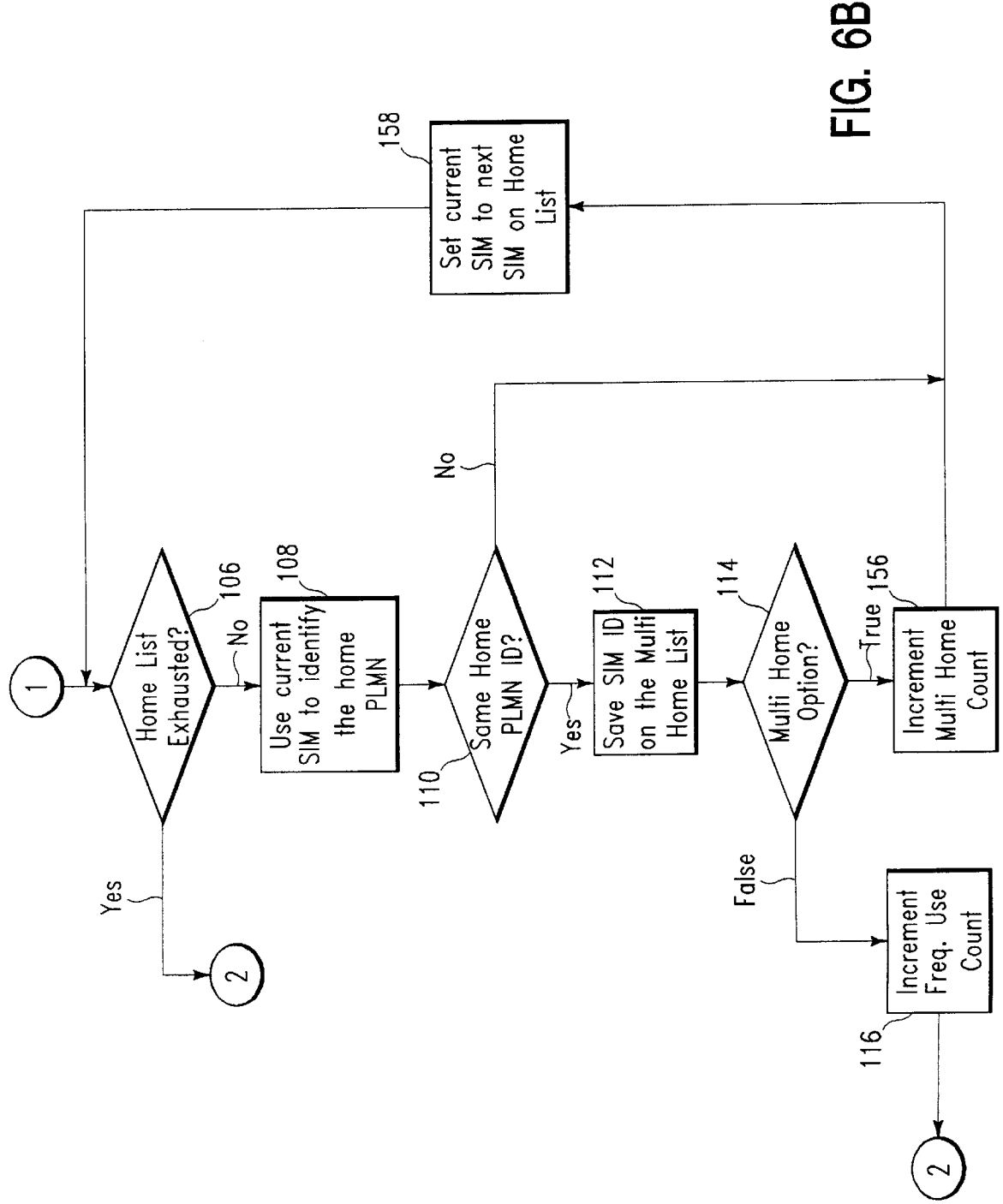
Figure 6C:
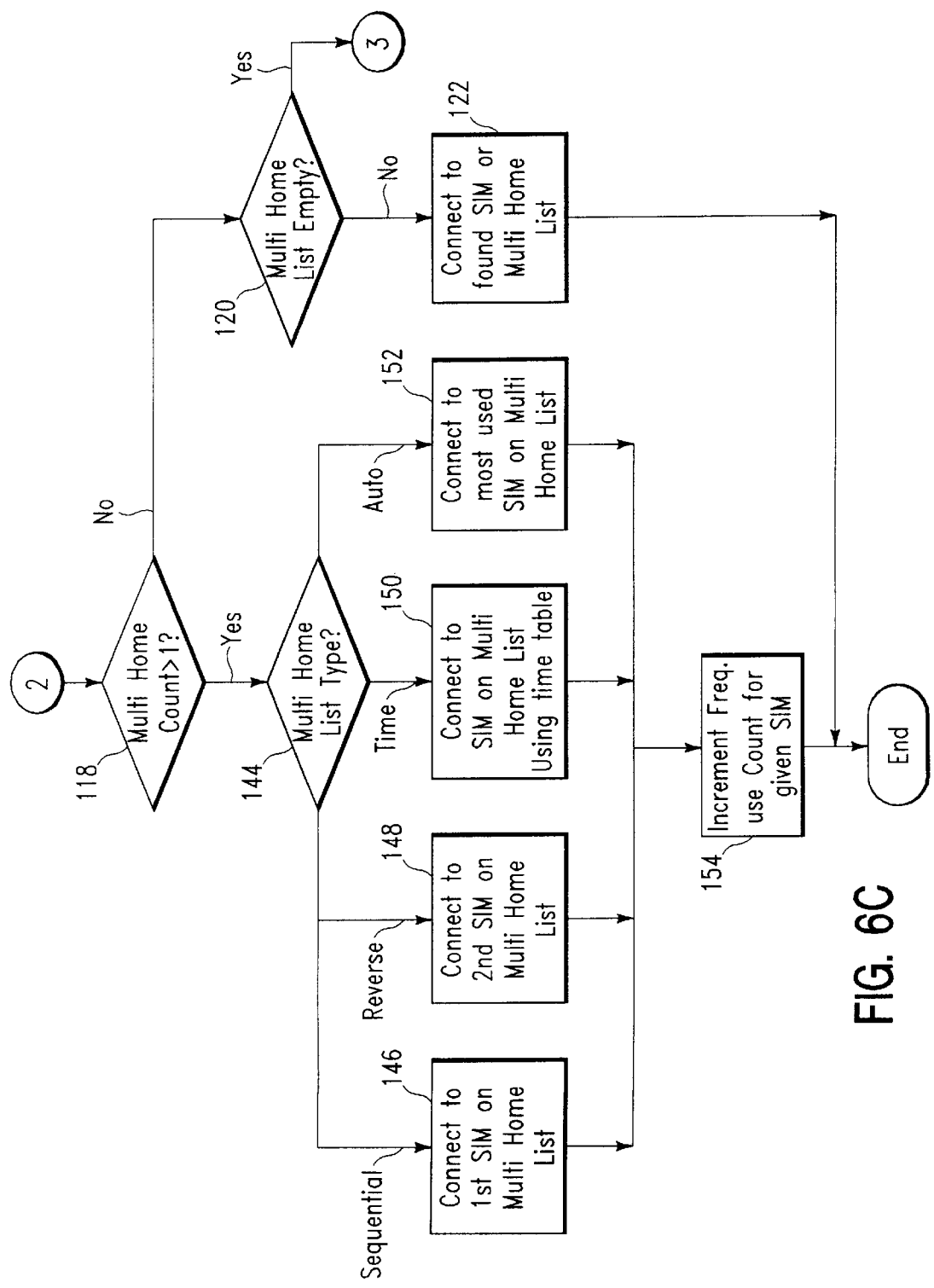
Figure 6D:
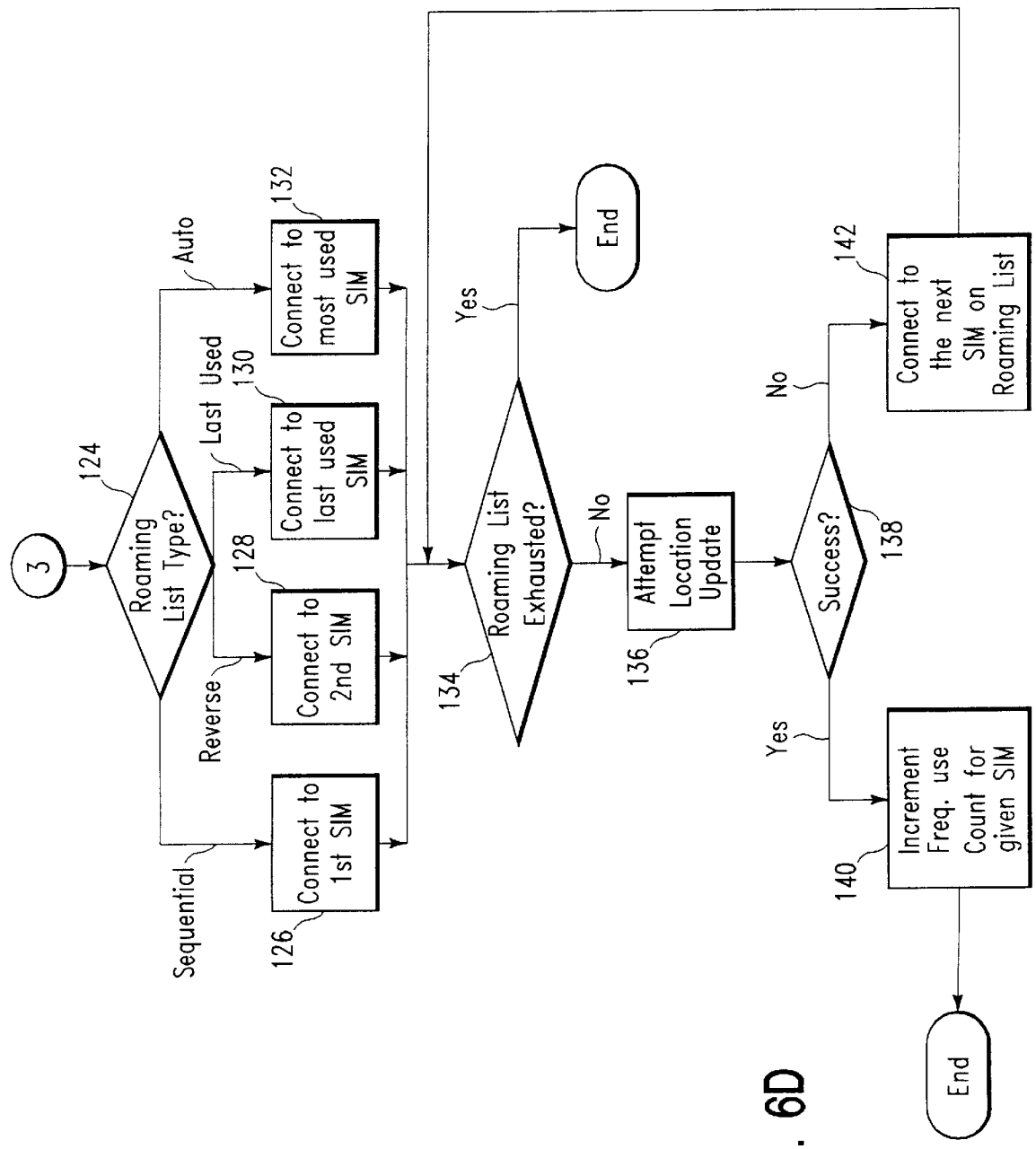
Figure 7:
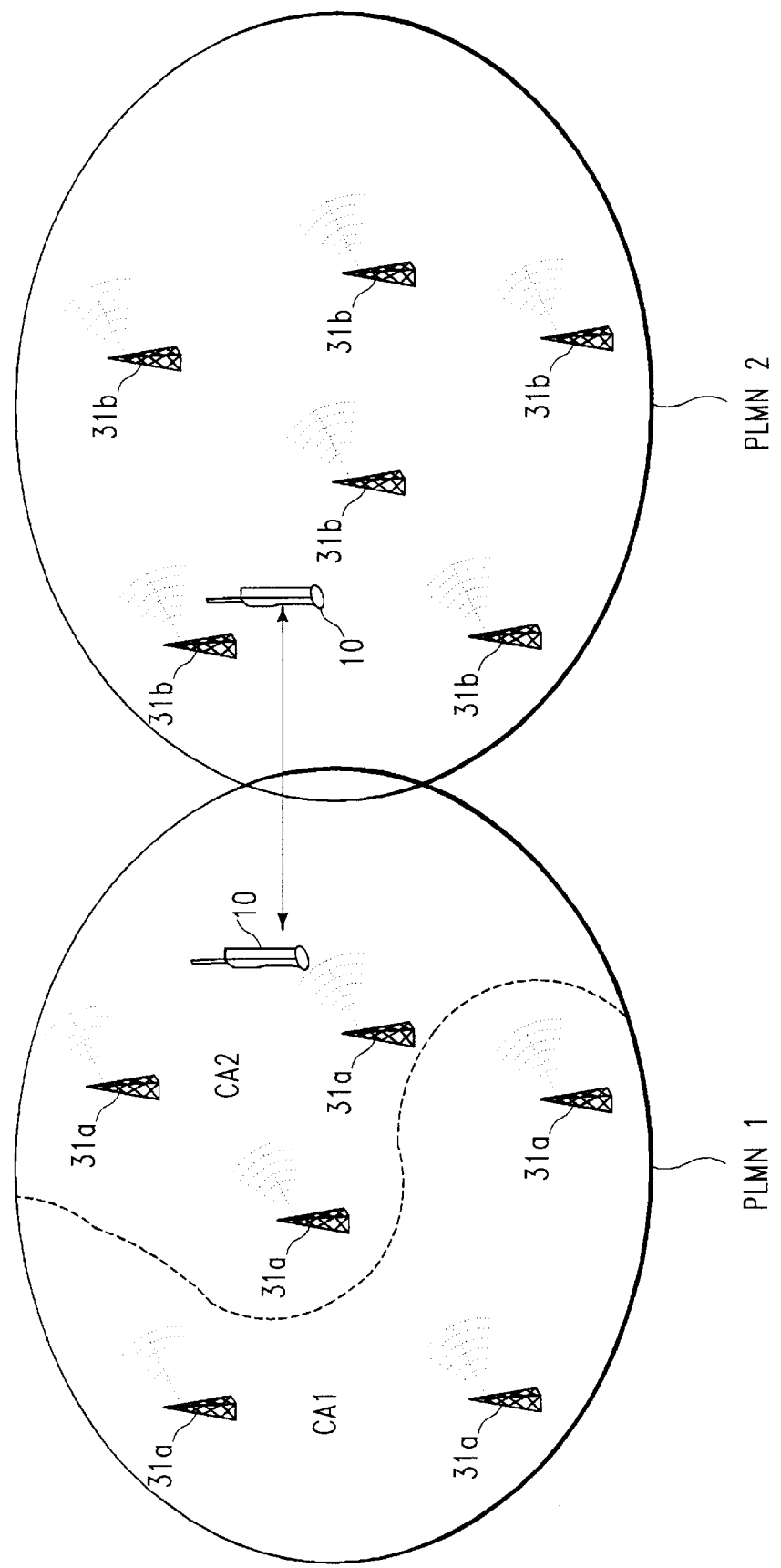
FIG. 7 is a diagram showing the PCS handset of FIG. 1 automatically switching between SIMs therein as such handset moves between PLMN boundaries.

Also disposed in the handset 10 are a microprocessor 33, a memory 28, a clock/calendar 29, a battery 19, and transceiver 30 coupled to the antenna 20, as shown in FIG. 5. An electronic switch 34 is disposed in the handset 10 for electrically coupling one of the SIMs 23a, 24b to the transceiver 30 selectively in accordance with a signal received by the transceiver 30 from one of a plurality of base station cells 31a, 31b (FIG. 7) and a program stored in the memory 28. It is noted that the base station cells 31a belong the same network, here PLMN1, and that base station cells 31b belong to a different network, here PLMN2, as shown in FIG. 7. Note that each base station cell 31a transmits an RF signal to indicate its unique cell station identification (CELL ID) and that it is part of the PLMN1 network. Likewise, each base station cell 31b transmits an RF signal to indicate its unique cell identification (CELL ID) and that it is part of the PLMN2 network. The selected one of the SIMs 23a, 24b provides one of the base station cells 31a, 31b in communication therewith, via the transceiver 30 and antenna 20, with the subscriber information stored in such one of the SIMS 23a, 24b. Thus, the transceiver 30 is disposed in the handset 10 for receiving and transmitting signals from and to one of the base station cells 31a, 31b (FIG. 7) in communication therewith. The memory 28 disposed in the handset 10 stores the executable program. The processor 33 in the handset 10 is responsive to the signals received by the transceiver 30 and the selected one of the SIMs 23a, 24b and is adapted to execute the program stored in memory 28 to produce a control signal on line 32 for the electronic switch 34 in accordance with the received signals, the information stored in the selected one of the SIMs 23a, 24b, information input by the subscriber (or default information provided by the manufacturer) and the executed program stored in memory 28. A manually operated switch 36 having a switch position mechanism exposed outside the handset 10 is provided for coupling one of the plurality of subscriber identity modules (SIMs) to the transceiver 30 and processor 33 by the user. Thus, the position of the A/B switch 36 as set by the user may be used to over-ride the processor 33 in producing the control signal on line 32 for the electronic switch 34.

Referring now to FIGS. 6A–6D, a flow diagram is shown representative of the processing performed by the program stored in the memory for each of a sequence of scans. It should first be noted that the program may be used with SIMs, whether removable/insertable or fixed within the handset, or NAMs. Therefore, while described below for SIMs, it should be understood that the method applies to NAMs or any other module which provides subscriber identity information. Thus, in Step 100, and assuming the handset is being used for the first time, the handset transceiver will not, initially, receive any signal from one of the plurality of base station cells 31a, 31b (FIG. 7). Therefore, the program will indicate that there is no PLMN indication stored in the memory being received by the handset transceiver. The process then, with the power to the handset turned on, proceed to Step 102. In Step 102 the processor feeds to the electronic switch a control signal to, in this example, select the first SIM1, as the SIM to be used by the transceiver. This selection of SIM1 is a preset default selection by the program. Next, the process proceeds to Step 104. In Step 104, a Multi-Home Counter in the handset is set to zero (0). As will become clearer, the Multi-Home Counter is provided for use by the processor where the two SIMs are associated with the same PLMN or PLMNs in the same geographical areas. This may occur, for example, where one SIM is to be used when the subscriber places business calls and the other SIM is to be used when the subscriber places personal calls. In any event, in this example, the handset is being used for the first scan so the Multi-Home Counter is set to zero (0). The process proceeds to Step 106.

In Step 106, a check is made of the Home List. The Home List is a list of all SIMs stored in the handset. Here, in this example, there are two SIMs stored in the handset, i.e., SIM1, SIM2. Further, Home List is arranged into a number of search procedures: (1) search the Home List of SIMs sequentially, i.e., select SIM1 followed by SIM2; (2) search the Home List of SIMs in reverse sequence, i.e., select SIM2 followed by SIM1; (3) search the Home List of SIMs starting with the last used Home SIM, (i.e., select the SIM which was the last SIM used in a home network); (4) search the Home List SIMs starting with the last used Home SIM as the selected SIM; and, (5) an automatic search which uses the last SIM in the home network, and, if not found, the last used SIM; and (6) using a Frequency-of-Use selection process, here based on probability of SIM use. (This probability is predicated on the frequency of use of each of the SIMs; if there has been equal use, the lowest ordered SIM is used, for example). The Home List search procedures are programmable by the subscriber. A default search procedure is established by the manufacturer, here the default procedure is the sequential search for the SIMs, i.e., select SIM1 followed by SIM2.

Continuing with the example, when Step 106 is performed for the first time, a search of the Home List has not been exhausted and there, from Step 106, the process proceeds to Step 108. In Step 108, the processor produces the control signal for the electronic switch to select the current SIM, here SIM1. The process proceeds to Step 110. The transceiver receives an indication from a nearby one of the base station cells 31*a*, 31*b* (FIG. 7) of the PLMN identification (PLMN ID) (of the PLMN to which the nearby cell station belongs to) in the cell station Broadcast Control Channel (BCCH). In Step 110, the processor compares the PLMN ID received from the nearby cell with the information stored in SIM1 and makes a determination as the whether the selected SIM, here SIM1, is associated with the PLMN of the nearby cell. If the selected SIM, here SIM1, is associated with the PLMN of the nearby cell, the process proceeds to Step 112.

In Step 112, the selected SIM identification number (SIM ID), here SIM1, is stored on the Multi-Home List. This Multi-Home List will be searched for cases where both SIMs are associated with the same PLMN. The process then proceeds to Step 114. In Step 114, the processor determines whether the subscriber has a Multi-Home option. More particularly, when the handset is purchased, if the subscriber selects a Multi-Home option, (i.e., an option in the handset enabling more than one SIM to access to service the same PLMN), a flag is set in the memory. Thus, in Step 114, the processor searches the memory to determine if the Multi-Home Option flag has been set. Thus, the process proceeds to Step 116 because the flag is not set.

In Step 116, the contents of a Frequency-of-Use Counter is incremented. More particularly, each one of the SIMS in the handset has an associated Frequency-of-Use Counter. As mentioned above, the contents of these Frequency-of-Use Counters provide an indication as to the number of times each one of the SIMS has been used. This provides a probability of use indication which is used in the Frequency-of-Use SIM search procedure mentioned above. In any event, suffice it to say here that in this example, since SIM1 been selected for use, its Frequency-of-Use Counter is incremented to a count of 1. The process then proceeds to Step 118.

In Step 118, the processor determines the contents of the Multi-Home Counter. As noted in Step 104, in this example, the Multi-Home Counter was set equal to 0. Therefore, because the count is less than a count of 1, the process proceeds to Step 120. In Step 120, the processor makes a determination as to whether the Multi-Home list is empty. In this example, because the Multi-Home option was not selected by the subscriber there will be only one SIM, i.e., SIM1 currently selected by the electronic switch control signal and associated with the PLMN of the nearby cell. Thus, in this example, the Multi-Home List will not be empty and the process proceeds to step 122.

In Step 122, the processor enables the transceiver to remain connected to SIM1 (i.e., the currently found SIM) via the electronic switch control signal and the handset processor has completed one scan. Thus, the processor rests for a predetermined time, here for about a minute to as long as a day or more as selected either automatically or by the user, until another scan is initiated in which case the process proceeds again to Step 100.

Referring back to Step 120, in the event that the Home List was empty, i.e., neither one of the SIMs, SIM1 or SIM2, are associated with the PLMN of the nearby cell, the handset goes into a Roaming Mode and the process proceeds to Step 124.

In Step 124, the processor determines the type of roaming list search sequence is to be perform. The handset may be programmed by the subscriber with here, one of four different roaming list search procedures: (1) search the SIMs sequentially, i.e., SIM1 followed by SIM2, Step 126; (2) search the SIMs in reverse sequence, i.e., SIM2 followed by SIM1, Step 128; (3) or a last used search which uses the last SIM used in any network, Step 130, and (4) Automatic search using the SIMs in order of greatest frequency of use based on the contents of the Frequency-of-Use Counters, Step 132. Thus, one of the SIMs i.e., SIM1 or SIM2 is chosen in accordance with the Roaming List search procedure selected by the subscriber, or by a default sequence which will be Step 132. The process then proceeds to Step 134.

In Step 134 the processor determines whether the Roaming List searching has been exhausted. In this example, if the first SIM selected is SIM1, the Roaming List will not have been exhausted because SIM2 has not been selected. Thus, the process proceeds to Step 136. In Step 136, the processor tries to perform a location update to the nearby cell. The process proceeds to Step 138. In Step 138, the processor determines whether the selected SIM, here SIM1, can access to the nearby one of the base station cells 31*a*, 31*b* in the roaming mode (i.e, by successful completion of the location update procedure). If it could, the Frequency-of-Use Counter would be incremented and the scan would be complete. Here, in this example, however, SIM1 is could not access to the PLMN of the nearby cell, and the process proceeds to Step 142.

In Step 142, the processor produces a control signal to select via the electronic switch SIM2. The process proceeds again to Step 134. The processor determines that the Roaming List has not been exhausted because an attempt with SIM2 has not been performed. Thus, the process repeats Step 136 with SIM2. In Step 136, the processor tries to perform a location update to the nearby cell. The process proceeds again to Step 138. In Step 138, the processor again determines whether the selected SIM, here SIM2, can access to the nearby cell. If it is, the Frequency-of-Use Counter is incremented and the scan is completed in Step 140. If SIM2 cannot access to the nearby cell, the process again proceeds to Step 142. Step 134 is performed again. Now, however, the Roaming List of SIMs is exhausted, i.e., both SIM1 and SIM2 have been selected and neither can access to the nearby one of the base station cells 31*a*, 31*b*. Thus, the scan is complete without the user having connected to any network (out-of-range).

Referring again to Step 114, if a Multi-Home Option had been selected by the subscriber, the process would have proceeded to Step 156 instead of to Step 116. In Step 156, the Multi-Home Counter would have been incremented to a count of 1. Further, the process would proceed to Step 158 and the processor would select the next SIM in the selected procedure, here SIM2 which may be associated with the same PLMN as, in this example, SIM1. The electronic switch connects SIM2 to the transceiver based on the signal received from the processor. The process again proceeds to Step 106. In Step 106, the processor determines whether the Home List search has been exhausted. In this case, the search has not been exhausted. Thus, the proceeds again proceeds to Step 108. In Steps 108 and 110, a determination is again made as to whether SIM2 is associated with the PLMN of the nearby cell. Because in this example, both SIM1 and SIM2 are associated with the same PLMN, the process proceeds to Step 112. In Step 112, the SIM ID, here SIM2, is saved on the Multi-Home List (i.e., in the memory) and the process proceeds to Step 114.

In Step 114, the process determines whether the Multi-Home Option flag has been set. In this case, the flag has been set and the process proceeds to Step 156. In Step 156, the Multi-Home List counter is incremented, here to a count of 2 and the process proceeds to Step 158. In Step 158, the program searches for the next SIM in the Home List and one is, in this case, not found so the process proceeds to Step 106. Now the Home List search has been exhausted and the process proceeds to Step 118.

In Step 118, the processor determines that the Multi-Home Counter has contents greater than 1 and therefore the process proceeds to Step 144. In Step 144 a determination is made by the processor as to the type of Multi-Home List Search has been selected. The Multi-Home Search Options are: (1) a Sequential search, i.e., connect the transceiver to the first SIM on the Multi-Home List, here SIM1 because there is a second SIM associated with the same PLMN as SIM1, here, for example, SIM2, (Step 146); (2) a Reverse search, i.e., connect the transceiver to the second SIM on the list, here SIM2 because there is a second SIM associated with the same PLMN as SIM2, here, for example, SIM1, (Step 148); (3) search based on Time-of-Day/Day-of-Week, i.e., connect the transceiver using a Time-of-Day/Day-of-Week Table stored in the memory 28 and a time-of-day clock/calendar 29 (FIG. 5) (Step 150) (i.e., for example use a business SIM from 8AM to 5PM weekdays and a personal SIM at other times of the day); and (4) search the SIM on an automatic basis (i.e., based on the contents of the Frequency-of-Use Counter, as described above (Step 152)). The process proceeds to either Step 146, Step 148, Step 150, or Step 152 in accordance with the search procedure selected by the subscriber, or a default procedure, for example, Step 146.

The process then proceeds to Step 154. In Step 154, the Frequency-of-Use Counter for the selected SIM is incremented and the scan is completed.

Referring again to Step 100, having completed at least one scan with an appropriate resting time, as described above, and the handset can access to the nearby cell with one of the SIMs, the process proceeds to Step 160. In Step 160, the processor determines during this scan whether the SIM is still associated with the nearby cell. If the SIM selected by the electronic switch is still associated with the PLMN of the nearby cell, the process proceeds to Step 162. In Step 162, the Time-of-Day/Day-of-Week Table in the memory 28 (FIG. 5) and the time-of-day clock/calendar 29 are used to select the SIM to be connected, via the electronic switch, to the transceiver. The process then proceeds to Step 164. If the processor selects a SIM different from the SIM currently coupled to the transceiver, the process proceeds to Step 166. In Step 166, the processor changes the control signal to the electronic switch to couple the other one of the SIMs to the transceiver and the Frequency-of-Use Counter is incremented to complete the scan. On the other hand, if in Step 164, the processor determines that the SIM currently being coupled to the transceiver is the same as that selected by the processor based on the time-of-day clock/calendar 29 and the Time-of-Day/Day-of-Week Table, the scan is completed.

Referring again to Step 160, if the processor determines that the PLMN of the nearby cell is a new PLMN, the process proceeds to Step 168. In Step 168, the processor determines the Home List search procedure selected by the subscriber. Here, as noted above, there are here six possible search procedures described above: (1) search the Home List of SIMs sequentially, i.e., select SIM1 followed by SIM2 (Step 170) (2) search the Home List of SIMs in reverse sequence, i.e., select SIM2 followed by SIM1 (Step 172); (3) "Last Home" search, search the Home List of SIMs starting with the last used Home SIM, (i.e., select the SIM which was the last SIM used in a home network (Step 174); (4) "Last Used" search, search the Home List SIMs starting with the last used SIM as the selected SIM (Step 176); (5) an automatic search which uses the last SIM in the home network, and, if not found, the last used Home SIM (Step 178); and (6) "Most Used Method" using a Frequency-of-Use selection process, here based on probability of SIM use (Step 180). The process then proceeds to Step 104 unless: If the procedure in Step 174 is selected, Step 182 is performed by the processor to determine whether the last used Home SIM was found, and is so, the process proceeds to Step 104, otherwise the procedure in Step 170 is used; and, If the procedure in Step 178 is selected, Step 184 is performed by the processor to determine whether the last used Home SIM was found, and is so, the process proceeds to Step 104, otherwise the procedure in Step 176 is used.

It should also be noted that each SIM may include a table of the CELL IDs of cell stations in the local calling area associated with such SIM. That is, let it be assumed that one portion of the cell stations 31a belong to one local calling area, i.e., CA1 (FIG. 7), and the other portion of cells 31a belong to another local calling area, i.e., CA2. One SIM in the PCS handset 10 may access to the PLMN1 without roaming charges in CA1 and another SIM may access to the PLMN1 without access charges in CA2. Thus, because as noted above, each one of the cell stations 31a, 31b also transmits a cell identification (CELL ID) unique to the cell station and in response to the CELL ID transmitted by the nearby cell station the PCS handset 10 searches the corresponding tables in its SIMs using the above process as it did in searching for PLAN ID in Step 110 and 160, to determined which SIM has such cell station in its table. Thus, if the processor determines the cell station is in SIM1 for example, SIM1 is selected for use by the handset. Thus, if the handset is in one of the PLMNs, say PLMN1, roaming charges will be avoided by having the handset automatically switch between SIMs as the handset moves between CA1 and CA2.

Other embodiments are within the spirit and scope of the appended claims. For example, while two SIMs have been described, the handset may hold more than two SIMS. In such case, a custom list may be specified for the user, or subscriber, to define any sequence possible for searching the SIMs, for example, SIM2 followed by SIM3, followed by SIM1, etc.). Further, the procedure described above can be modified to process more than two SIMs. Still further, as noted above, the use of the term subscriber identity module above and in the foregoing claims refers to SIMs, NAMs or any other module which is adapted to provide subscriber identity information.

What is claimed is:

1. A method of operating a personal communication handset that has:

a plurality of subscriber identity modules disposed in the handset;

a transceiver for receiving and transmitting signals from and to a base station cell;

an electronic switch having a plurality of input ports, each one of the ports being electrically connected to a corresponding one of the plurality of subscriber identity modules, such switch coupling one of the input ports to an output port selectively in response to a control signal, such output port being electrically connected to the transceiver;

a memory storing an executable program, such memory including a calendar table; and a processor, such method comprising:

operating the processor to execute the stored program to produce the control signal in accordance with the executed program including information in the calendar table.

2. A method of operating a personal communication handset that has:
- a plurality of subscriber identity modules disposed in the handset;
- a transceiver for receiving and transmitting signals from and to a base station cell;
- an electronic switch having a plurality of input ports, each one of the ports being electrically connected to a corresponding one of the plurality of subscriber identity modules, such electronic switch coupling one of the input ports to an output port selectively in response to a control signal, such output port being electrically connected to the transceiver;
- a memory storing an executable program, such memory including a calendar table;
- wherein each one of the subscriber identity modules stores therein subscriber identification information and;
- wherein the one of the modules selected by the control signal provides the base station with the subscriber identification information stored therein; and,
- a processor, such method comprising:
    operating the processor for automatically executing the stored program to produce the control signal in accordance with the executed program including information in the calendar table and independent of the signals received from the base station cell.

* * * * *